United States Patent
Guo (10) Patent No.: US 11,551,471 B2
(45) Date of Patent: Jan. 10, 2023

(54) DISPLAY SCREEN MODULE, TERMINAL DEVICE AND FINGERPRINT IDENTIFICATION METHOD

(71) Applicant: BEIJING XIAOMI MOBILE SOFTWARE CO., LTD., Beijing (CN)

(72) Inventor: Yanshun Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/813,879

(22) Filed: Mar. 10, 2020

(65) Prior Publication Data

US 2021/0165994 A1 Jun. 3, 2021

(30) Foreign Application Priority Data

Nov. 28, 2019 (CN) .......................... 201911194018.9

(51) Int. Cl.
```
G06V 40/13      (2022.01)
G06V 40/12      (2022.01)
G06F 3/041      (2006.01)
G06F 3/042      (2006.01)
```

(52) U.S. Cl.
CPC ........ *G06V 40/1365* (2022.01); *G06F 3/0412* (2013.01); *G06F 3/0421* (2013.01); *G06F 3/0428* (2013.01); *G06V 40/1318* (2022.01)

(58) Field of Classification Search
CPC .............. G06K 9/00087; G06K 9/0004; G06F 3/0412; G06F 3/0421; G06F 3/0428; G06V 40/1365; G06V 40/1318
See application file for complete search history.

(56) References Cited

U.S. PATENT DOCUMENTS

| | | | |
|---|---|---|---|
| 2010/0067757 A1* | 3/2010 | Arai ..................... | G06K 9/0004 382/128 |
| 2017/0220844 A1* | 8/2017 | Jones .................... | G06F 3/0421 |
| 2018/0210600 A1* | 7/2018 | Lee ....................... | G06F 3/0488 |
| 2018/0239885 A1* | 8/2018 | Kumar ............... | G06V 40/1306 |
| 2018/0260602 A1 | 9/2018 | He et al. | |

(Continued)

FOREIGN PATENT DOCUMENTS

| CN | 208622074 U | 3/2019 |
|---|---|---|
| EP | 3407579 A1 | 11/2018 |

OTHER PUBLICATIONS

Extended European Search Report in Application No. 20166440, dated Aug. 24, 2020.

*Primary Examiner* — Stephen G Sherman
(74) *Attorney, Agent, or Firm* — Syncoda LLC; Feng Ma (57) ABSTRACT

A display screen module includes a display screen and a fingerprint identification unit. The display screen includes a front display area and a side display area. The side display area at least partially covers the fingerprint identification unit, and the fingerprint identification unit is configured to obtain a fingerprint image. As the fingerprint identification unit is at least partially covered by the side display area, it can reduce or even needs not to occupy under-screen space of the front display area, and arrangement of the components can be optimized. When the user directly holds the side display area to which the fingerprint identification unit corresponds, fingerprint unlocking can be executed directly, which brings new fingerprint unlocking experience to the user, and also makes the unlocking process easier.

15 Claims, 6 Drawing Sheets

(56) References Cited

U.S. PATENT DOCUMENTS

2019/0286879 A1    9/2019  Li et al.
2019/0353540 A1*  11/2019  Hong ...................... G06F 3/041
2020/0137911 A1*  4/2020  Kim ....................... H05K 5/069

* cited by examiner

DISPLAY SCREEN MODULE, TERMINAL DEVICE AND FINGERPRINT IDENTIFICATION METHOD

CROSS-REFERENCE TO RELATED APPLICATION

This application claims priority to Chinese Patent Application No. 201911194018.9 filed on Nov. 28, 2019, the disclosure of which is hereby incorporated by reference in its entirety.

BACKGROUND

Many terminal devices, such as mobile phones, tablet computers and other electronic devices, are adopting full-screen displays. The screen ratio of the display screen is approaching 100%, and the display screen can even extend to the side of the middle frame.

SUMMARY

The present disclosure relates to the field of electronics, and more specifically, to a display screen module, a terminal device and a fingerprint identification method, which have the fingerprint identification function.

The present disclosure provides a display screen module, comprising a display screen and a fingerprint identification unit, the display screen includes a front display area, a side display area, and a transition area that connects the front display area and the side display area, the side display area at least partially covers the fingerprint identification unit, and the fingerprint identification unit is configured to obtain a fingerprint image.

Further, the side display area and the transition area jointly cover the fingerprint identification unit.

Further, the transition area is arc-shaped and tangent to the front display area and the side display area, respectively.

Further, the fingerprint identification unit is flexible and includes a first section and a second section connected to the first section; the first section extends along a straight line, and the side display area covers the first section; and the second section extends along a curve, and the transition area covers the second section.

Further, the fingerprint identification unit comprises an optical fingerprint sensor, an ultrasonic fingerprint sensor or a capacitive fingerprint sensor.

Further, the fingerprint identification unit includes an optical fingerprint sensor, the display screen module includes a filter layer for filtering impurity light, the filter layer is disposed between the display screen and the fingerprint identification unit and covers the fingerprint identification unit.

Further, the filter layer is coated on the fingerprint identification unit or is vapor-deposited on the fingerprint identification unit.

Further, the display screen module includes an optical clear adhesive, and the filter layer is adhered to the display screen through the optical clear adhesive.

Further, the display screen module includes a connecting adhesive, the connecting adhesive includes a first adhesive surface and a second adhesive surface, the fingerprint identification unit is adhered to the first adhesive surface and is located between the connecting adhesive and the display screen.

In another aspect, the present disclosure further provides a terminal device comprising a main body and the display screen module as described above, the display screen at least partially surrounds the main body, and the fingerprint identification unit is located between the display screen and the main body.

In yet another aspect, the present disclosure further provides a fingerprint identification method applied to a terminal device, the terminal device including a display screen and a fingerprint identification unit, the display screen including a front display area, a side display area, and a transition area that connects the front display area and the side display area, the side display area and the transition area jointly covering the fingerprint identification unit, wherein the fingerprint identification method comprises: acquiring a fingerprint image of a finger in contact with the side display area and the transition area; and comparing the fingerprint image with a predetermined fingerprint image to determine whether there is a match.

It is to be understood that both the foregoing general description and the following detailed description are exemplary and explanatory only and are not restrictive of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The embodiments set forth in the following description of exemplary embodiments do not represent all embodiments consistent with the present disclosure. Instead, they are merely examples of apparatuses and methods consistent with aspects related to the present disclosure as recited in the appended claims.

The terminology used herein is for the purpose of describing particular embodiments only, not intended to be limiting. Unless otherwise defined, the technical or scientific terms used in the present disclosure shall have the common meanings understood by those with ordinary skills in the art. The terms "first," "second," and the like used in the description and the claims of the present disclosure do not indicate any order, quantity, or importance, but are only used to distinguish different components. Also, similar words such as "a" or "one" do not indicate a limit on quantity, but rather indicate that there is at least one. And "multiple" or "several" means two or more. Unless otherwise stated, similar words such as "front," "rear," "lower" and/or "upper" are merely for convenience of explanation, not limited to one position or one spatial orientation. Similar words such as "include" or "comprise" mean that the elements or articles before "include" or "comprise" encompass the elements or articles listed after "include" or "comprise" and their equivalents, without excluding other elements or objects. Words such as "connected" or "connecting" are not limited to physical or mechanical connections, but may include electrical connections, regardless of direct or indirect connections. The singular forms "a," "the," and "said" used in this specification and the claims of the present disclosure are intended to include the plural forms as well, unless the context clearly indicates otherwise. It should also be understood that the term "and/or" as used herein refers to and includes any or all possible combinations of one or more of the associated listed items.

While the full screen brings ultimate sensory experience to the user, it will also affect the layout of other elements, especially when the display screen extends to the side of the middle frame, the space reserved for elements such as the fingerprint identification element gets smaller and smaller, if it is desired to retain the fingerprint identification function, arrangement of these elements needs to be changed.

Various embodiments of the present disclosure provide a display screen module and a terminal device, the terminal device is, for example, an electronic device such as a mobile phone, a tablet computer, a notebook computer and so on, the display screen module includes a display screen and a fingerprint identification unit, the display screen includes a front display area and a side display area, the side display area at least partially covers the fingerprint identification unit, and the fingerprint identification unit is configured to obtain a fingerprint image.

Figure 1:
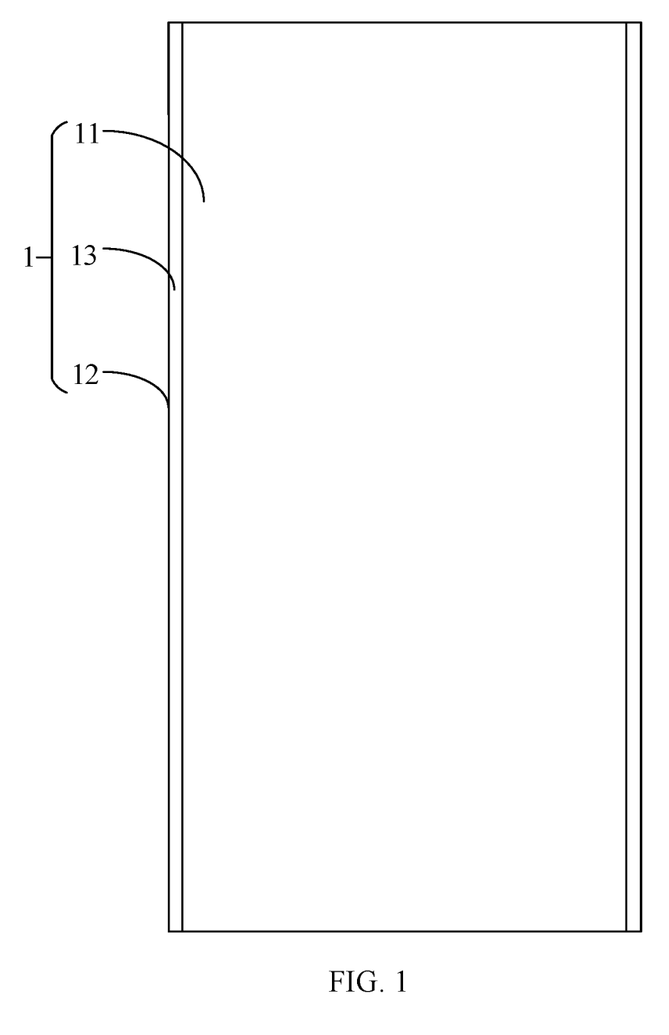
FIG. 1 is a schematic front view of a first embodiment of a display screen module of the present disclosure.
Figure 2:
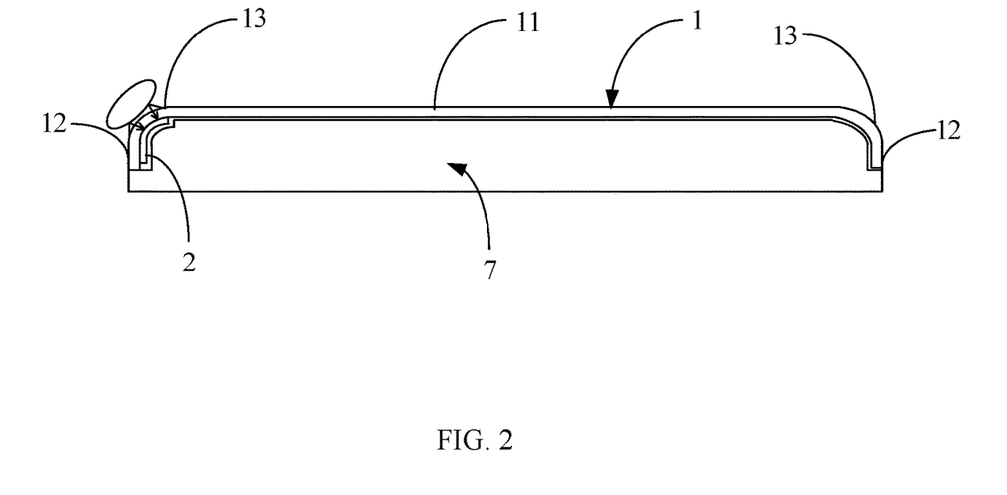
FIG. 2 is a schematic bottom view of a terminal device according to the present disclosure, in which the terminal device includes the display screen module shown in FIG. 1, the ellipse represents a finger.

With reference to FIGS. 1 to 2, the terminal device includes a display screen module and a main body 7 (the main body can be understood as a collection of all elements of the terminal device except the display screen module), the display screen module includes a display screen 1 and a fingerprint identification unit 2, an OLED display can be selected as the display screen 1, the OLED display has the advantages such as high transparency and low thickness, which is beneficial for obtaining fingerprint images, of course, other display screens having high transparency and low thickness can also be selected in other embodiments. FIG. 2 is a bottom view of the display screen module after being assembled with the main body 7, from a bottom-up perspective, the display screen 1 is generally in a shape of "E" opening downward, or inverse "U" shape.

The display screen 1 includes a front display area 11, a side display area 12, and a transition area 13 that connects the front display area 11 and the side display area 12. The front display area 11 can be used as the front display area of the terminal device, the side display area 12 can be used as the side display area of the terminal device, and the transition area 13 is the connection area between the front display area 11 and the side display area 12 and is located on two sides in the width direction of the front display area 11, it is equivalent to a chamfered surface. The front display area 11 and the side display area 12 are non-coplanar. The "plane" in the "non-coplanar" here may be a flat surface or a curved surface with constant curvature, such as the same spherical surface or the same cylindrical surface.

The side display area 12 at least partially covers the fingerprint identification unit 2, the fingerprint identification unit 2 is configured to obtain a fingerprint image in contact with the side display area 12. The transition area 13 is arc-shaped and is tangent to the front display area 11 and the side display area 12, respectively. In other embodiments, the display screen 1 can also not be provided with the transition area 13, the fingerprint identification unit 2 can also be covered completely by the side display area 12.

The fingerprint identification unit 2 needs not to occupy under-screen space of the front display area, which optimizes arrangement of the elements. Meanwhile, because the fingerprint identification unit 2 needs to penetrate the display area to obtain fingerprint images, if it is disposed below the front display area 11, thickness of respective functional film layers of the front display area 11 is required to be reduced and the display effect of the front display area is affected to increase the identification success rate. The side display area 12 is only used to display some prompt information, the display effect demanding is not high, and thus thickness of the film layer can be reduced or the film layers can be reduced to improve the success rate of fingerprint identification. On the other hand, the fingerprint identification unit 2 is disposed on the side display area 12, even if the display screen 1 needs to be lighted at night to perform fingerprint identification, since the side display area 12 does not directly face the user's eyes, the generated light will not hurt the eyes; in addition, when the user directly holds the side display area 12 to which the fingerprint identification unit 2 corresponds, fingerprint unlocking is performed directly, which makes the unlocking process easier while bringing new fingerprint unlock experience to users.

In this embodiment, the side display area 12 and the transition area 13 jointly cover the fingerprint identification unit 2, that is, the fingerprint identification unit 2 can acquire fingerprint images in contact with the side display area 12 and the transition area 13. Since the fingerprint identification unit 2 can obtain fingerprint images of two areas, it is beneficial to increase the size of the fingerprint sensing area, thereby increasing the success rate of fingerprint identification, and avoiding multiple times of identifications from affecting the user experience. In addition, the user can directly observe partial identities of the fingerprint sensing area located in the transition area from the front, which is convenient for the user to operate. The display screen 1 and the fingerprint identification unit 2 can be fixed by adhesion of colloidal substance (not shown in FIG. 2).

In this embodiment, the fingerprint identification unit 2 can include an optical fingerprint sensor, an ultrasonic fingerprint sensor, or a capacitive fingerprint sensor. After the optical fingerprint identification unit 2 obtains a fingerprint image, comparison analysis can be performed through a fingerprint identification chip, and can also be implemented by using a processing module of the terminal device. It should be noted that if the fingerprint identification unit 2 includes an optical fingerprint sensor, it is necessary to light up the display screen 1 to provide detection light for fingerprint identification; and if the fingerprint identification unit 2 includes an ultrasonic fingerprint sensor, there is no need to light up the display screen 1, and the terminal device can be directly unlocked at night to prevent the display screen 1 from being light up and hurting the eyes.

The fingerprint identification unit 2 includes a first section 21 and a second section 22 connected to the first section 21. The first section 21 extends along a straight line, and the side display area 12 covers the first section 21; and the second section 22 extends along a curve, and the transition zone 13 covers the second section 22. Alternatively, the fingerprint identification units 2 are all flexible, and the fingerprint identification unit 2 can be well adhered to the display screen 1 to reduce the distance from the user's finger and further improve the success rate of fingerprint identification. In some embodiments, the fingerprint identification unit 2 includes a flexible substrate and a thin-film sensor (such as an ultrasonic fingerprint sensor or an optical fingerprint sensor) formed on the flexible substrate, the flexible substrate can be selected from PI (Polyimide) or PET (Polyethylene terephthalate) materials.

Figure 3:
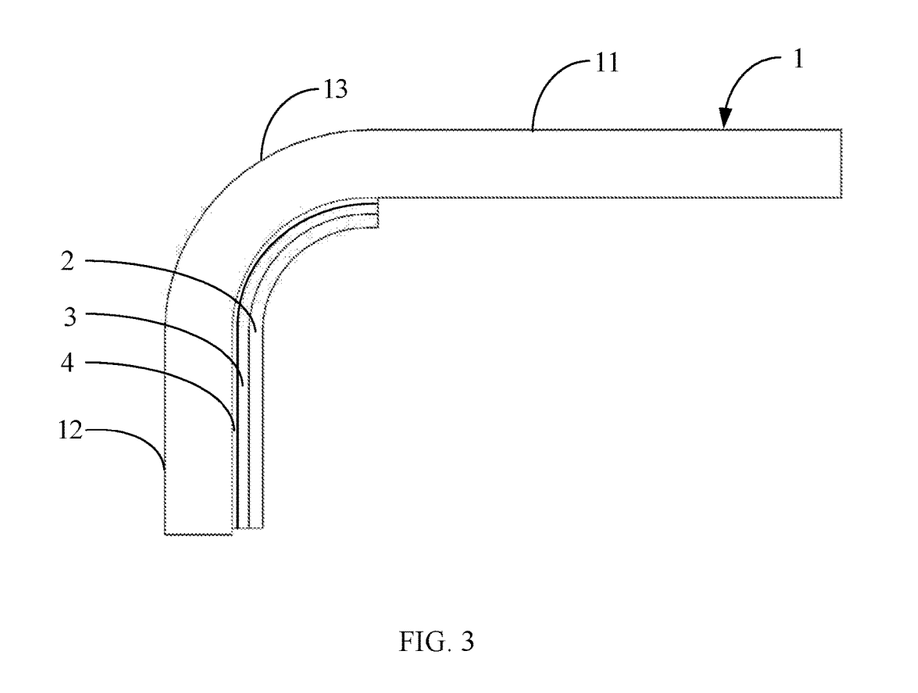
FIG. 3 is a schematic bottom view of a second embodiment of the display screen module of the present disclosure, in which only a part of the display screen module is shown.

With reference to FIG. 3, compared with the display screen module shown in FIG. 2, the display screen module of this embodiment further includes a filter layer 3, and the fingerprint identification unit 2 includes an optical fingerprint sensor. The filter layer 3 is disposed between the display screen 1 and the fingerprint identification unit 2, covers the fingerprint identification unit 2, and is configured to filter impurity light, such as infrared light, which affects the acquisition of fingerprint images.

In some embodiments, the display screen module further includes a transparent optical clear adhesive 4, the filter layer 3 is directly coated to the fingerprint identification unit 2 through a coating process, and is adhered to the inner side (the part corresponding to the side display area 12 and the transition area 13) of the display screen 1 through the optical clear adhesive 4, that is, the fingerprint identification unit 2 is connected to the display screen 1 through the optical clear adhesive 4. In other embodiment, the filter layer 3 can be vapor-deposited on the flexible substrate of the fingerprint identification unit 2 and adhered to the inside of the display screen 1 through the optical clear adhesive 4.

Figure 4:
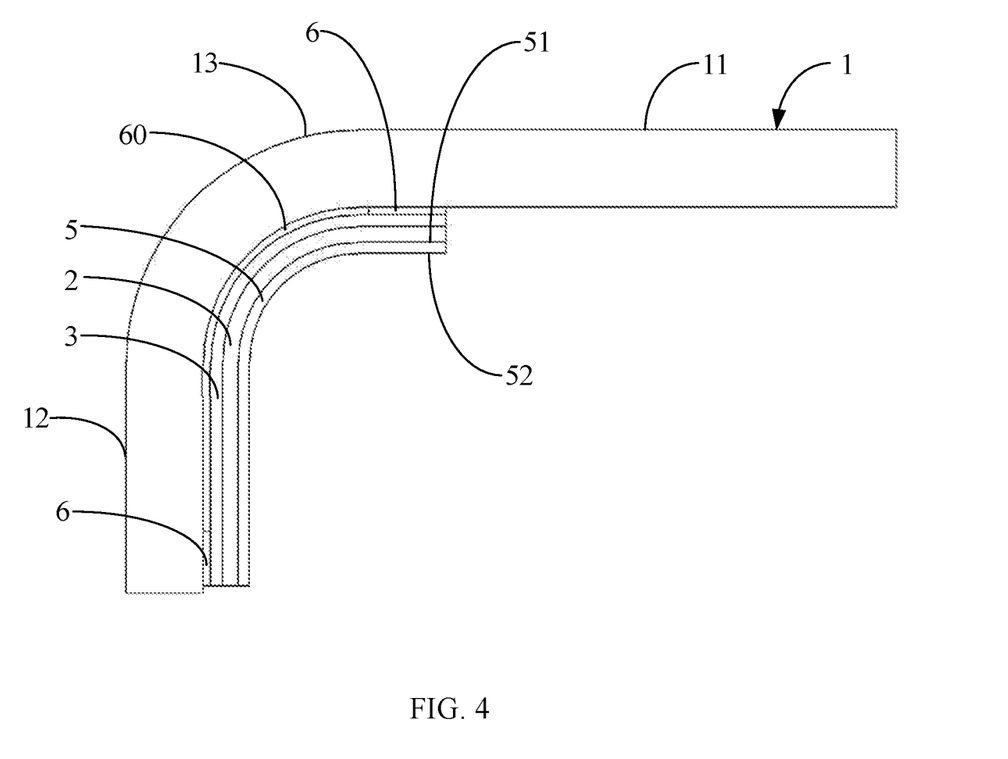
FIG. 4 is a schematic bottom view of a third embodiment of the display screen module of the present disclosure, in which only a part of the display screen module is shown.

With reference to FIG. 4, compared with the display screen module shown in FIG. 2, the display screen module of this embodiment further includes a filter layer 3, a connecting adhesive 5, and a sealing member 6. The connecting adhesive 5, the fingerprint identification unit 2, the filter layer 3, the sealing member 6, and the display screen 1 are sequentially disposed from the inside to the outside. Similarly, the fingerprint identification unit 2 of this embodiment includes an optical fingerprint sensor, the filter layer 3 is used to filter impurity light; the sealing member 6 is selected from sealing foam and its number is two, a sealed gap 60 is formed between two sealing members 6, and the sealed gap 60 can be used as a design margin to allow some elements to be deformed appropriately to avoid fracture due to space deforming.

The connecting adhesive 5 includes a first adhesive surface 51 and a second adhesive surface 52. The fingerprint identification unit 2 is adhered to the first adhesive surface 51. The fingerprint identification unit 2 is located between the connecting adhesive 5 and the display screen 1, and the second adhesive surface 52 is used to connect to other elements of the terminal device, such as the middle frame, so as to fix the fingerprint identification unit 2 to the middle frame. In other embodiment, the fingerprint identification unit 2 can also implement its own fixation by fixing of the display screen 1 and the middle frame.

Figure 5:
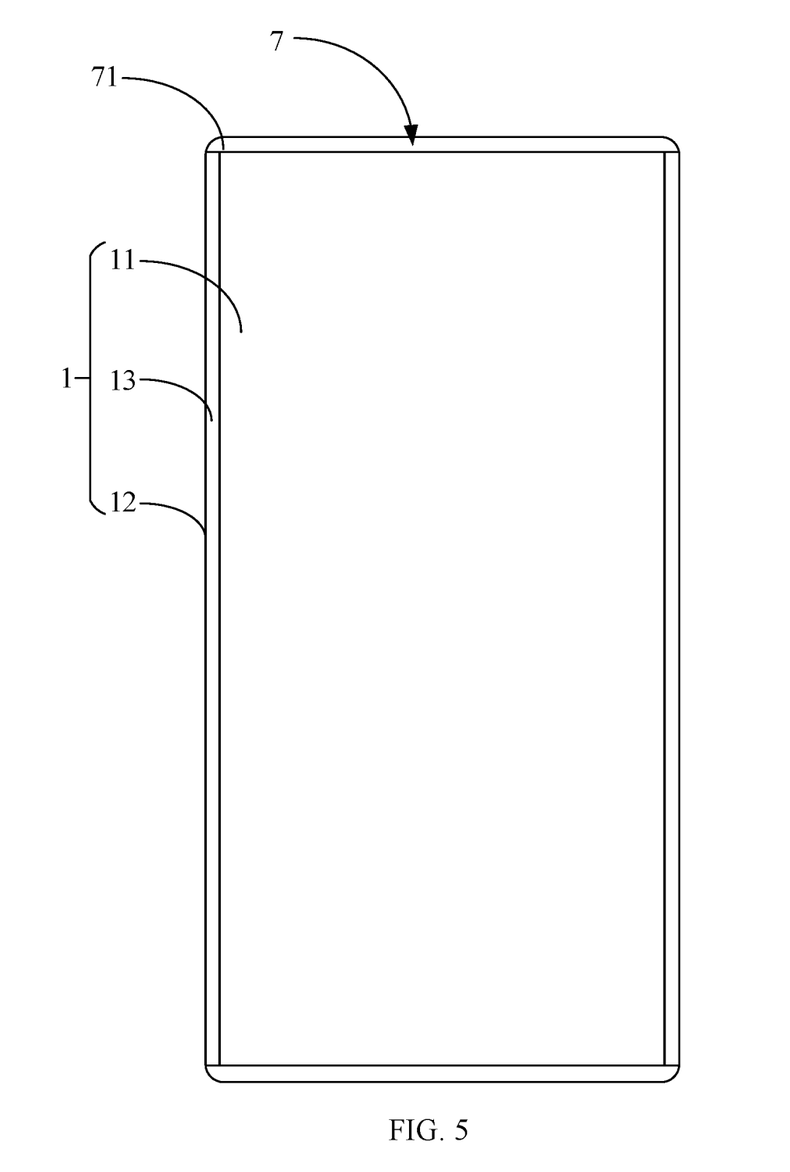
FIG. 5 is a schematic front view of an embodiment of a terminal device according to the present disclosure.
Figure 6:
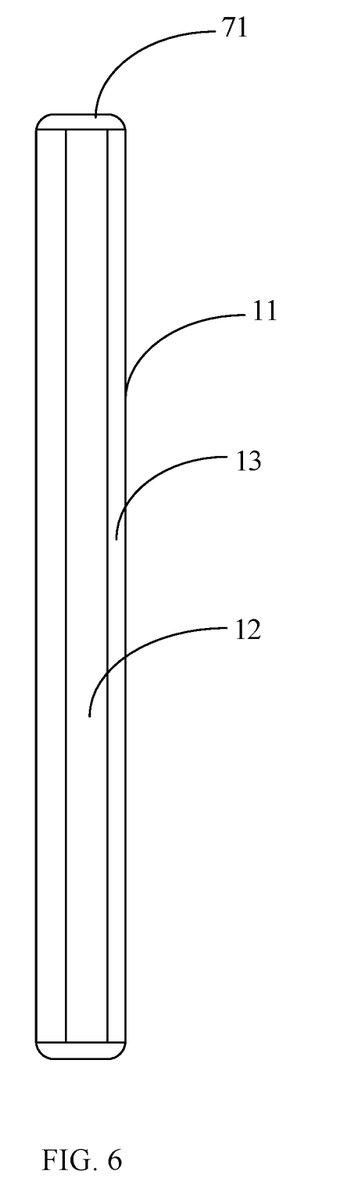
FIG. 6 is a schematic side view of the terminal device shown in FIG. 5.
Figure 7:
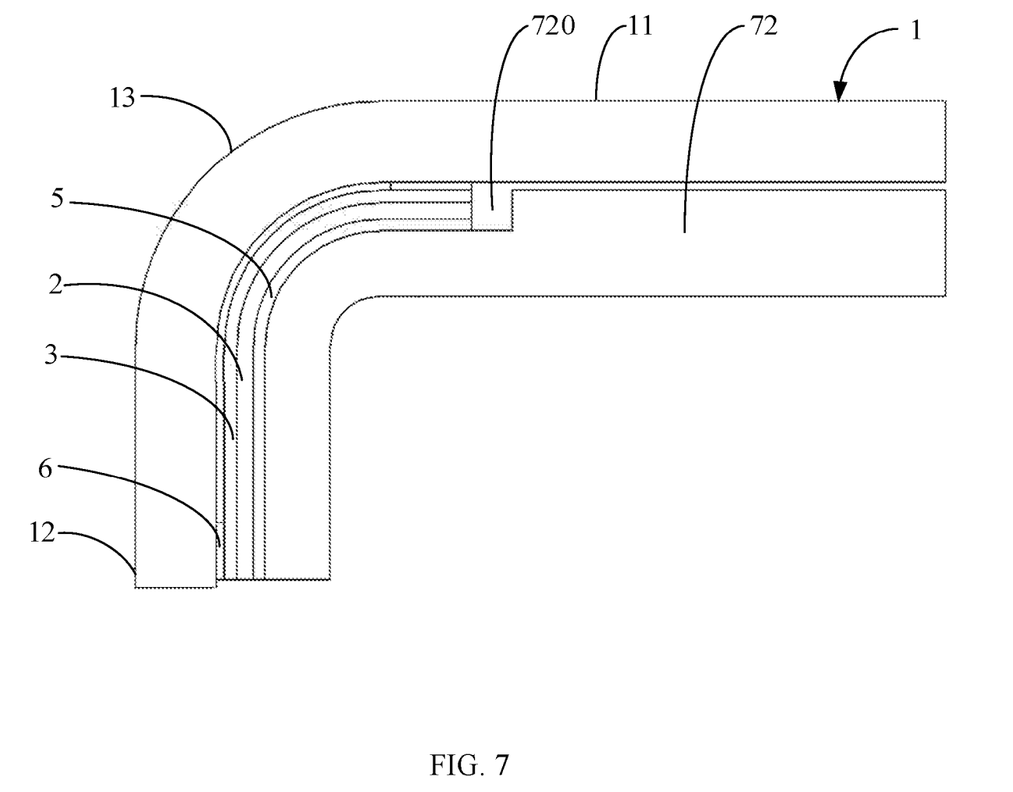
FIG. 7 is a schematic bottom view of the terminal device shown in FIG. 6, in which only a part of the terminal device is shown.

With reference to FIGS. 5 to 7, the present disclosure further provides a terminal device, such as a mobile phone, the terminal device includes a main body 7 and a display screen module of any of the foregoing embodiments. The display screen 1 partially surrounds the main body 7. Of course, if the display screen 1 has a ring shape, it can surround the main body 7. The main body 7 includes a casing 71 and a middle frame 72. Of course, the main body 7 also includes a processor, a power supply component, a memory, an antenna component and other structures, which are not described in detail in this embodiment.

With references to FIGS. 4 and 7, the connecting adhesive 5 is adhered to the middle frame 72 through the second adhesive surface 52, so as to implement fixation of the fingerprint identification unit 2 and the middle frame 72, the fingerprint identification unit 2 is located between the display screen 1 and the main body 7. The middle frame 72 is provided with a yielding space 720, the yielding space 720 is used for accommodating elements such as the fingerprint identification unit 2, the filter layer 3, etc.

The fingerprint identification unit is at least partially covered by the side display area, which can reduce or even needs not to occupy under-screen space of the front display area, and the arrangement manner of elements is optimized. Meanwhile, because the fingerprint identification unit 2 needs to penetrate the display area to obtain fingerprint images, if it is disposed below the front display area 11, it is required to reduce thickness of respective functional film layers on the front display area 11 to affect the display effect of the front display area. However, the side display area is only used to display auxiliary some prompt information, display effect requirement is different, and thus thickness of the film layer can be reduced to improve the success rate of fingerprint identification. On the other hand, the fingerprint identification unit 2 is disposed on the side display area, even if the display screen needs to be lighted at night to perform fingerprint identification, since the side display area 12 does not directly face the user's eyes, the generated light will not hurt the eyes; in addition, when the user directly holds the side display area to which the fingerprint identification unit corresponds, fingerprint unlocking is performed directly, which also makes the unlocking process easier while bringing new fingerprint unlocking experience to the user.

Various embodiments of the present disclosure further provide a fingerprint identification method applied to the terminal device provided above. The fingerprint identification method comprises:

Step S1, a fingerprint image of a finger in contact with the side display area and the transition area is acquired.

If the fingerprint identification unit 2 includes an optical fingerprint sensor, the display screen 1 can be lighted up to provide detection light (indicated by a line with an arrow in FIG. 7) for fingerprint identification; if the fingerprint identification unit 2 includes an ultrasonic fingerprint sensor, fingerprint identification can be performed without lighting up the display screen.

Step S2, the fingerprint image is compared with a predetermined fingerprint image to determine whether there is a match.

The fingerprint image and a predetermined image of a fingerprint database are compared through a fingerprint identification chip or the processor of the terminal device to determine whether there is a match, so as to determine whether to respond to a user operation.

Since the fingerprint identification unit 2 can acquire fingerprint images of the side display area 12 and the transition area 13 concurrently, it is beneficial to increase the size of the fingerprint sensing area, thereby increasing the success rate of fingerprint identification, and avoiding the need for multiple times of identification to affect the user experience.

In some embodiments of the present disclosure, the fingerprint identification unit is at least partially covered by the side display area, which can reduce or even needs not to occupy the under-screen space of the front display area, and arrangement of the elements is optimized; in addition, when the user directly holds the side display area to which the fingerprint identification unit corresponds, fingerprint unlocking is executed directly, which makes the unlocking process easier while bringing new fingerprint unlocking experience to the user.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A display screen module, comprising:
  a display screen; and
  a fingerprint identification sensor including a first section, and a second section connected to the first section,
  the display screen including a front display area, a side display area, and a transition area that connects the front display area and the side display area;
  the side display area and the transition area jointly covering the fingerprint identification sensor, wherein the transition area is non-coplanar with both the front display area and the side display area; and
  the fingerprint identification sensor being configured to obtain a fingerprint image,
  wherein:
  the fingerprint identification sensor is flexible,
  the first section extends along a straight line,
  the side display area covers the first section,
  the second section extends along a curve,
  the transition area covers the second section, and
  fingerprint unlocking is executed upon a user holding the side display area to which the fingerprint identification sensor corresponds.

2. The display screen module according to claim 1, wherein the transition area is arc-shaped and tangent to the front display area and the side display area, respectively.

3. The display screen module according to claim 1, wherein the fingerprint identification sensor comprises an optical fingerprint sensor, an ultrasonic fingerprint sensor or a capacitive fingerprint sensor.

4. The display screen module according to claim 1, wherein the fingerprint identification sensor includes an optical fingerprint sensor, the display screen module includes a filter layer for filtering impurity light, the filter layer is disposed between the display screen and the fingerprint identification sensor and covers the fingerprint identification sensor.

5. The display screen module according to claim 4, wherein the filter layer is disposed on the fingerprint identification sensor in at least one of following processes: coating and vapor-depositing.

6. The display screen module according to claim 5, wherein the display screen module includes an optical clear adhesive, and the filter layer is adhered to the display screen through the optical clear adhesive.

7. The display screen module according to claim 1, wherein the display screen module includes a connecting adhesive, the connecting adhesive includes a first adhesive surface and a second adhesive surface, and the fingerprint identification sensor is adhered to the first adhesive surface and is located between the connecting adhesive and the display screen.

8. A terminal device comprising the display screen module according to claim 1, and a main body;
  the display screen at least partially surrounding the main body; and
  the fingerprint identification sensor being located between the display screen and the main body.

9. The terminal device according to claim 8, wherein the transition area is arc-shaped and tangent to the front display area and the side display area, respectively.

10. The terminal device according to claim 8, wherein the fingerprint identification sensor comprises an optical fingerprint sensor, an ultrasonic fingerprint sensor, or a capacitive fingerprint sensor.

11. The terminal device according to claim 8, wherein
  the fingerprint identification sensor includes an optical fingerprint sensor;
  the display screen module includes a filter layer for filtering impurity light;
  the filter layer is disposed between the display screen and the fingerprint identification sensor and covers the fingerprint identification sensor; and
  the filter layer is disposed on the fingerprint identification sensor in at least one of following processes: coating and vapor-depositing.

12. The terminal device according to claim 11, wherein
  the display screen module includes an optical clear adhesive; and
  the filter layer is adhered to the display screen through the optical clear adhesive.

13. The terminal device according to claim 12, wherein the fingerprint identification sensor does not occupy under-screen space of the front display area; and the terminal device is configured to unlock upon a user directly holding the side display area to which the fingerprint identification unit corresponds.

14. The terminal device according to claim 8, wherein the display screen module includes a connecting adhesive;
the connecting adhesive includes a first adhesive surface and a second adhesive surface; and
the fingerprint identification sensor is adhered to the first adhesive surface and is located between the connecting adhesive and the display screen.

15. A fingerprint identification method for a terminal device, the terminal device including a display screen and a fingerprint identification sensor, the display screen including a front display area, a side display area, and a transition area that connects the front display area and the side display area, the fingerprint identification sensor including a first section, and a second section connected to the first section, wherein the fingerprint identification method comprises:
acquiring a fingerprint image of a finger in contact with the side display area and the transition area, the side display area and the transition area jointly covering the fingerprint identification sensor; and
comparing the fingerprint image with a predetermined fingerprint image to determine whether there is a match;
wherein the transition area is non-coplanar with both the front display area and the side display area,
wherein:
the fingerprint identification sensor is flexible,
the first section extends along a straight line,
the side display area covers the first section;
the second section extends along a curve,
the transition area covers the second section, and
fingerprint unlocking is executed upon a user holding the side display area to which the fingerprint identification sensor corresponds.

\* \* \* \* \*